(12) United States Patent
Sokolofsky et al.

(10) Patent No.: US 8,621,952 B2
(45) Date of Patent: Jan. 7, 2014

(54) ZERO BACKLASH GEARING

(75) Inventors: Phillip M. Sokolofsky, Akron, NY (US); Gerald M. Goupil, Jr., N. Tonawanda, NY (US); Craig A. Corra, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 655 days.

(21) Appl. No.: 12/845,096

(22) Filed: Jul. 28, 2010

(65) Prior Publication Data

US 2012/0024094 A1     Feb. 2, 2012

(51) Int. Cl.
 *F16H 55/08* (2006.01)
 *F16H 55/10* (2006.01)
 *F16H 55/12* (2006.01)

(52) U.S. Cl.
 USPC .............................................. 74/457; 74/439

(58) Field of Classification Search
 USPC ............ 74/434, 439, 446, 447, 448, 457, 460
 See application file for complete search history.

(56) References Cited

U.S. PATENT DOCUMENTS

| 441,460 | A | * | 11/1890 | Atwood | 74/460 |
| 447,552 | A | * | 3/1891 | Atwood | 74/460 |
| 1,081,996 | A | * | 12/1913 | Weist | 74/460 |
| 1,093,279 | A | * | 4/1914 | Loftus | 74/460 |
| 1,147,805 | A | * | 7/1915 | Kunz et al. | 74/460 |
| 1,871,417 | A | * | 8/1932 | Mansur | 74/445 |

* cited by examiner

*Primary Examiner* — Justin Krause
(74) *Attorney, Agent, or Firm* — James M. Chan

(57) ABSTRACT

Each generic gear includes one tooth disposed in each of the sockets, and each tooth extends radially outward from one of the sockets and throat thereof. The teeth of the generic gear include resilient material adjacent the throat for compressing and allowing movement of each tooth relative to the outer periphery. In the species of FIG. 1, each tooth is entirely of the resilient material and diverges or circumferentially widens from adjacent the throat to define a gap from the throat to the outer periphery. In the species of FIG. 2, each tooth has a shell integral with the hub and a core of the resilient material fills each shell and extends into the socket to define a crescent-shaped gap with the socket end.

4 Claims, 2 Drawing Sheets

ZERO BACKLASH GEARING

BACKGROUND OF THE INVENTION

1. Field of the Invention

The subject invention relates to a gear for transmitting mechanical power.

2. Description of the Prior Art

Like all manufactured components, gears and their installation are subject to manufacturing tolerances. In the prior art, if gear teeth are too large or if a first gear and its mating gear are too close together, there is interference between the first gear and its mating gear. As a result, the gears do not mate smoothly and excessive friction occurs between the gears. In addition, backlash takes place when the gear teeth are too small or if a first gear and its mating gear are too far apart. As a result, the gears do not remain in continuous contact, and transmission of power is not smooth and constant.

Prior art gears, such as U.S. Pat. No. 4,184,380 disclose using a coating of resilient material on the gear teeth. The thickness of the coating increases the overall width of the tooth to take up backlash space and the resilient material of the coating compresses and is compressed or displaced as it encounters the mating gear to reduce interference friction.

Other gears in the prior art enable movement of the gear teeth relative to the outer periphery of the gear to prevent backlash while reducing interference friction. For example, US2007/0180943 discloses gear teeth integral with and extending radially out from the outer periphery and defining openings and slots enabling circumferential movement of the teeth relative to the outer periphery of the gear.

Prior art gears include a cam groove in the gear hub to provide a path of motion for another machine element. The presence of a cam groove limits the size and depth of slots and openings defined by the gear teeth to enable circumferential movement. The slots and openings are also limited in size and depth as the gear diameter decreases.

One type of gear in the prior art includes a hub that has an outer periphery and defines sockets about the outer periphery for retaining a gear tooth in each socket. Each socket extends from the outer periphery and into the hub and terminates at a socket end with a throat or waist that is narrower circumferentially than the socket end. A gear tooth is disposed in each socket and extends radially outward from each of the sockets and throat thereof to a top land surface. An example of such a gear is disclosed in U.S. Pat. No. 5,203,861 to Irwin et al., however each gear tooth is fixed and prevented from moving circumferentially thereby providing no accommodation for backlash.

SUMMARY OF THE INVENTION

The subject invention provides such a gear wherein each of the teeth extends out of a socket and includes a resilient material adjacent the throat of the socket for compressing and allowing movement of each tooth relative to the outer periphery of the gear hub.

ADVANTAGES OF THE INVENTION

This invention unexpectedly and ingeniously takes up backlash space and reduces interference friction through yielding of the gear teeth in two different modes simultaneously: circumferential movement and compression or displacement of resilient tooth material. As a first gear tooth encounters a mating gear tooth, the resilient material of the tooth bends at the throat of the socket providing circumferential movement of the gear teeth. Also, as the gear tooth encounters a mating gear tooth, the resilient material of the gear tooth adjacent the throat may compress or move to reduce interference friction. The unique structure of this invention is an improvement in gear design to eliminate backlash in gear teeth while avoiding interference friction. The improvements of this invention may also be adapted to have minimal penetration of slots or openings into the hub of the gear so that it can be used on small diameter gears and gears that contain cam grooves in the hub.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
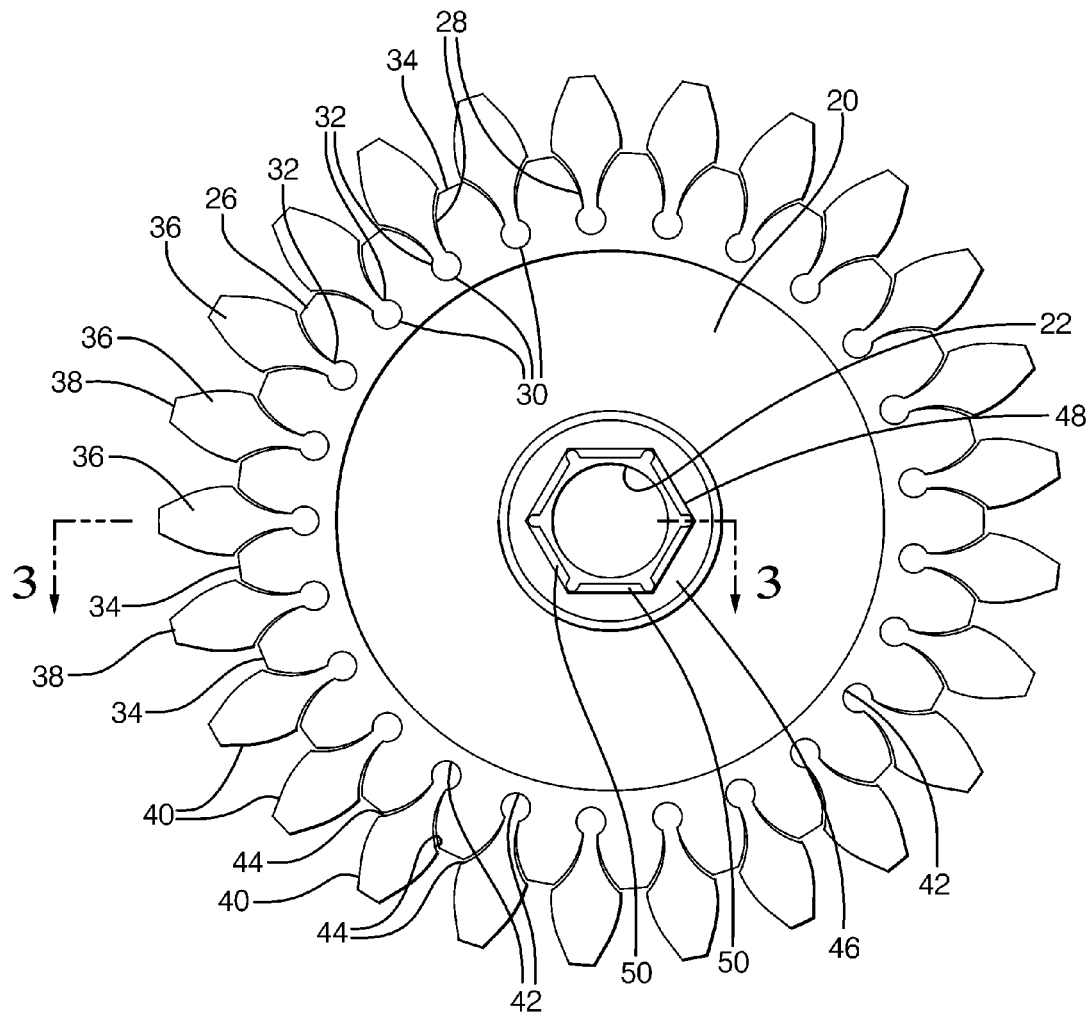
FIG. 1 is a side view of a sector of a first species of gear constructed in accordance with the subject invention.
Figure 3:
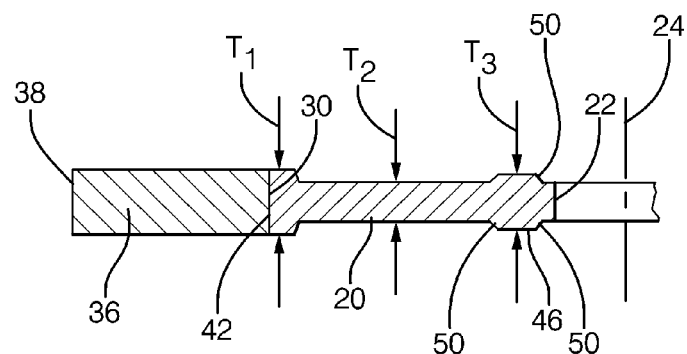
FIG. 3 is a sectional view taken along line 3-3.
Figure 2:
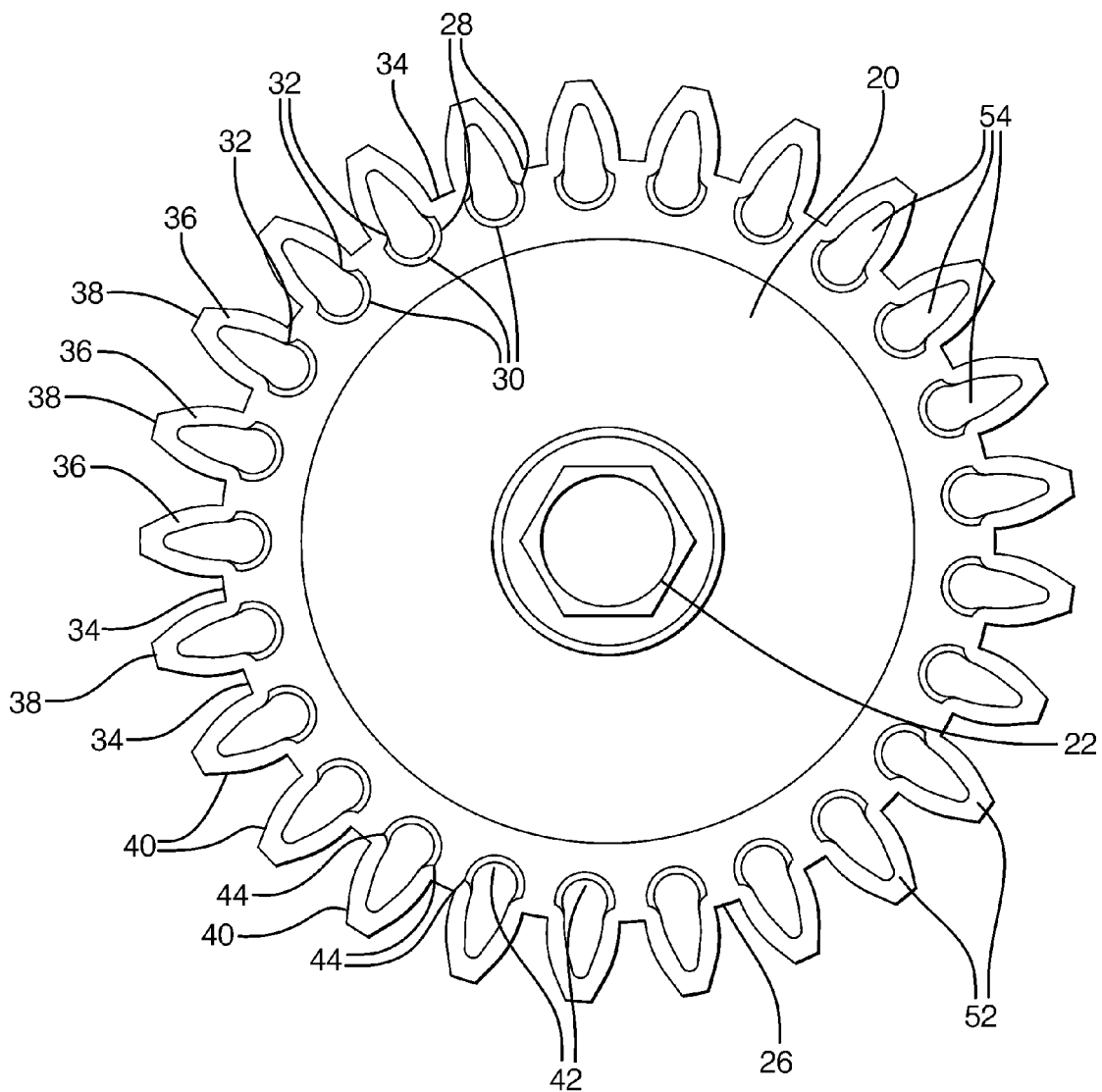
FIG. 2 is a side view of a sector of a second species of gear constructed in accordance with the subject invention.

Referring to the Figures, wherein like numerals indicate corresponding parts throughout the several views, a species of a gear for transmitting mechanical power in accordance with the instant invention is shown in each of FIGS. 1 and 2.

Generically, each gear includes a disk-like hub 20 defining a bore 22 extending axially through the hub 20 and which defines a central axis 24 of rotation for the generic gear. The hub 20 also includes an outer periphery 26 encircling the outside of the hub 20 and which is coaxial with the central axis 24. In the axial direction, the hub 20 has a first thickness $T_1$ extending radially inward from the outer periphery 26, and the hub has a second thickness $T_2$ thinner than the first thickness $T_1$ extending radially inward from the first thickness $T_1$ toward the bore 22.

The hub 20 also defines sockets 28 equally spaced circumferentially from one another about the outer periphery 26. Each socket 28 extends radially inward from the outer periphery 26 into the first thickness $T_1$ and terminates at a socket end 30. The socket ends 30 are arcuate or semi-circular and each socket 28 also includes a throat 32 that is circumferentially narrower than the socket ends 30. The outer periphery 26 defines bottom land surfaces 34 that are interleaved with the sockets 28 about the outer periphery 26 so that bottom land surfaces 34 extend circumferentially between each of the sockets 28.

The generic gear includes one tooth 36 disposed in each of the sockets 28, and each of the teeth 36 extends radially outward from the sockets 28 and throats 32 thereof to terminate at a top land surface 38. The top land surface 38 may be of any contour, from flat to pointed. Each of the teeth 36 presents face/flank surfaces 40 spaced apart and extending radially with the top land surface 38 extending circumferentially therebetween. Each of the teeth 36 has a proximal end 42 disposed in its corresponding socket 28. The proximal end 42 is arcuate and circumferentially wider than the throat 32.

Each tooth of the generic gear includes resilient material adjacent the throat 32 for compressing and allowing movement of each tooth 36 relative to the outer periphery 26. The resilient material returns to its original shape after being bent, compressed, or stretched. The sockets 28 and the resilient material of each of the teeth 36 define at least one gap 44 therebetween.

In the species of FIG. 1, the teeth 36 diverge or circumferentially widen from adjacent the throat 32 to the face/flank surfaces 40. From the face/flank surfaces 40, the teeth 36 converge or circumferentially narrow toward the top land surface 38. Each of the sockets 28 also diverges or circumferentially widens from the throat 32 to the outer periphery 26, but diverges to a lesser degree than the teeth 36 diverge to define one gap 44 from the throat 32 to the outer periphery 26 on each side circumferentially of each tooth 36. As shown in FIG. 1, each of the teeth 36 is entirely of the resilient material. The proximal ends 42 of the gear teeth 36 are complementary to and fill the arcuate socket ends 30.

The hub 20 of both species of FIGS. 1 and 2 (although not shown in FIG. 2) defines a boss 46 coaxial with the central axis 24 which has a third thickness $T_3$ in the axial direction which is at least greater than the second thickness $T_2$. The boss 46 defines a recess 48 having a hexagonal shape that could, for example, receive a nut. Fillets 50 extend between the boss 46 and the hub 20.

In the species of FIG. 2, each of the teeth 36 has a shell 52 integral with the hub 20. The shell 52 extends about the top land surface 38 and radially outward from and integrally interconnecting adjacent bottom land surfaces 34. As shown in FIG. 2, a core 54 of the resilient material fills each of the shells 52 from beneath the top land surface 38 and extending into the socket 28 to define the proximal end 42 of each tooth 36. The proximal ends 42 and the socket ends 30 define a crescent-shaped gap 44 between each of the proximal ends 42 and the socket ends 30.

While the invention has been described with reference to two exemplary species, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular species disclosed as the best mode contemplated for carrying out this invention, but that the invention will include all species falling within the scope of the appended claims.

What is claimed is:

1. A gear for transmitting mechanical power comprising;
   a hub having an outer periphery and defining sockets about said outer periphery,
   each of said sockets extending radially from said outer periphery into said hub and each terminating in a socket end,
   each of said sockets including a throat narrower circumferentially than said socket end,
   a gear tooth disposed in each of said sockets and extending radially outward from each of said sockets and said throat thereof,
   and each of said teeth including a resilient material adjacent said throat for compressing and allowing movement of said tooth relative to said outer periphery of said hub;
   wherein said resilient material of each of said teeth and each of said sockets define at least one gap therebetween;
   wherein each of said gear teeth has a proximal end disposed in said sockets and being circumferentially wider than said throat;
   wherein each of said teeth extend radially outward from each of said sockets and said throat thereof to a top land surface;
   wherein each of said teeth diverge from adjacent said throat toward said top land surface;
   wherein each of said sockets diverge from said throat to said periphery to a lesser degree than said diverging teeth to define a pair of said gaps on each side circumferentially of each of said teeth from said throat to said outer periphery.

2. A gear as set forth in claim 1 wherein each of said teeth are entirely of said resilient material.

3. A gear for transmitting mechanical power comprising;
   a hub having an outer periphery and defining sockets about said outer periphery,
   each of said sockets extending radially from said outer periphery into said hub and each terminating in a socket end,
   each of said sockets including a throat narrower circumferentially than said socket end,
   a gear tooth disposed in each of said sockets and extending radially outward from each of said sockets and said throat thereof,
   and each of said teeth including a resilient material adjacent said throat for compressing and allowing movement of said tooth relative to said outer periphery of said hub;
   wherein each of said sockets and said resilient material of each of said teeth define at least one gap therebetween;
   wherein each of said gear teeth has a proximal end disposed in said sockets and being circumferentially wider than said throat
   wherein each of said proximal ends is complementary to and fills said socket ends.

4. A gear for transmitting mechanical power comprising;
   a hub with a bore defining a central axis of rotation,
   said hub having an outer periphery coaxial with said central axis,
   said hub having a first thickness in the axial direction extending radially inward from said outer periphery and a second thickness thinner than said first thickness extending radially inward from said first thickness toward said bore,
   said hub defining sockets equally spaced circumferentially from one another about said outer periphery,
   said outer periphery defining bottom land surfaces circumferentially spaced from one another and interleaved with said sockets about said outer periphery,
   each of said sockets extending from said outer periphery and into said first thickness and terminating in a socket end,
   each of said socket ends being arcuate,
   each of said sockets including a throat circumferentially narrower than said socket end,
   a gear tooth disposed in each said sockets and extending radially outward from each of said sockets and said throat thereof,
   each of said teeth presenting a pair of radially extending and spaced face/flank surfaces,
   a top land surface extending circumferentially between said pair of face/flank surfaces,
   said gear teeth having a proximal end disposed in said sockets and being arcuate and circumferentially wider than said throat,
   each of said teeth including a resilient material adjacent said throat for compressing and allowing movement of said tooth relative to said outer periphery of said hub, and
   each of said sockets and said resilient material of each of said teeth define at least one gap therebetween;
   wherein each of said teeth diverge from adjacent said throat to said face/flank surfaces and converge toward said top land surface, each of said sockets diverge from said throat to said periphery to a lesser degree than said diverging teeth to define a pair of said gaps on each side circumferentially of said teeth from said throat to said outer periphery,
each of said teeth being entirely of said resilient material,
each of said proximal ends is complementary to and fills said arcuate socket ends,
said hub defining a boss coaxial with said central axis and having a third thickness in the axial direction being greater than said second thickness,
said boss defining a recess having a hexagonal shape and coaxial with said central axis, and
fillets between said boss and said hub.

* * * * *